Sept. 29, 1942.  E. A. DRISCOLL  2,297,540
PREVENTION OF ICE FORMATION
Filed June 5, 1941
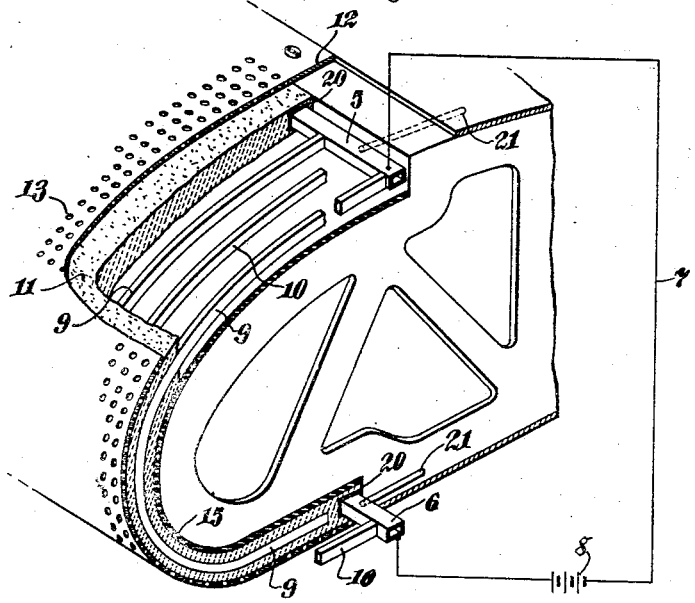
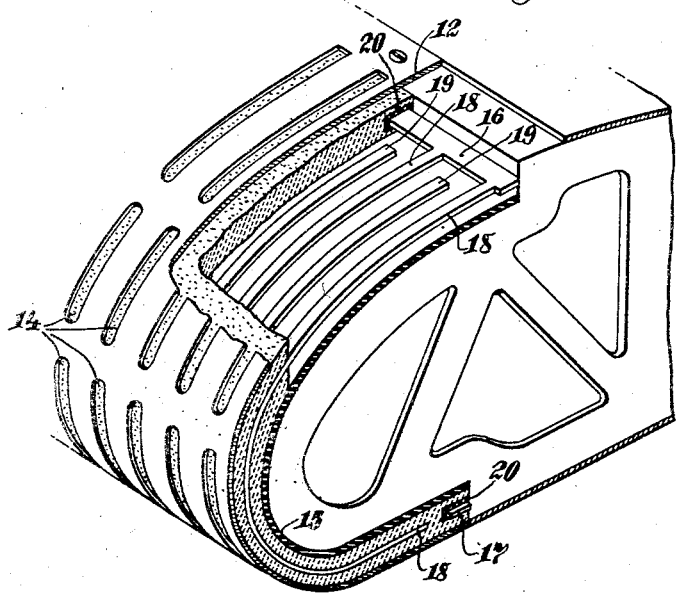
Edward A. Driscoll,
INVENTOR.
BY Philip S. McLean
ATTORNEY.

Patented Sept. 29, 1942

2,297,540

UNITED STATES PATENT OFFICE 2,297,540

PREVENTION OF ICE FORMATION

Edward A. Driscoll, Jamaica, N. Y.

Application June 5, 1941, Serial No. 396,669

4 Claims. (Cl. 244—134)

The invention here disclosed relates to the prevention of ice formation on aircraft surfaces and is in the nature of an improvement on the inventions covered in U. S. Patents 1,943,062, Jan. 9, 1934, and 2,137,394 Nov. 22, 1938.

In the patents referred to, the formation of ice is prevented by arranging conductors of opposite polarity in an absorbent medium, which is an insulator when dry and which when moist, permits passage of current between the conductors sufficient to prevent formation of ice.

Objects of the present invention are to adapt such automatic ice prevention means to modern aircraft requirements and particularly to provide the necessary conductors in a form light enough to be practical for aircraft installation, rigid and strong enough to resist and prevent vibration and having a desirably high degree of current transmissibility, so as to immediately, automatically become effective at the start under ice forming conditions, Other desirable objects and the special novel features of the invention will appear as the specification proceeds.

The drawing accompanying and forming part of the specification illustrates certain practical embodiments of the invention. The structure however, may be modified and changed in other ways than shown, all within the true intent and broad scope of the invention as hereinafter defined and claimed.

Fig. 1 is a broken and part sectional perspective view of a form of the invention as built into the leading edge of an airplane wing.

Fig. 2 is a similar view of a modification.

In Fig. 1, the conductors of opposite polarity are shown as made up of flat hollow bus bars 5 and 6, connected by wiring 7, with opposite sides of a source of current 8, and having spaced parallel tubular branches 9, 10, of opposite polarity and disposed in alternating order, in a body or layer 11, of normally insulating absorbent medium.

The tubular bus bars and branches form flat hollow light-weight grids of high surface transmitting ability, flexible enough to be readily fitted to the air foil outline, but rigid and strong enough to hold the shapes to which they have been formed and to resist and avoid vibration. Preferably, these grids may be made of light gage aluminum tubing of substantially flat or rectangular cross-section. Light-weight brass or copper tubing also may be employed. The absorbent material which forms the insulation when dry and becomes the conductive path when moist, may be asbestos and this may be in fibrous, matted or woven condition.

Protection against abrasion and desired smooth stream-lining is provided in the present invention by a covering 12, of sheet material secured over the absorbent insulating-conductive layer and made previous to moisture as by perforations 13, in Fig. 1 or slots 14, in Fig. 2.

The number, size, location and shape of the perforations, slots or openings in the cover may be varied to meet particular requirements. In some instances, as for particularly high speed craft, it may be sufficient just to place a few openings in the forwardly facing portion of the cover sheet.

To prevent moisture passing on through the absorbent layer, a water-proof base layer 15, of rubber or other suitable underlying material is provided.

In Fig. 2, the bus strips 16, 17, and branches 18, 19, are shown as struck out of thin flat sheet metal. The conductive grids so formed can be readily shaped to the air foil outline and at the same time, can be sufficiently stiff and rigid to avoid undesirable vibrational tendencies.

The ice prevention equipment can be built into the wings or control surfaces or in other locations where ice formation is liable to occur, as permanent portions of the craft or these ice preventers can be made up as attachments applicable as such when icing conditions are likely to be encountered. The integrally formed or connected character of the bus strips and branches is of great advantage in applying and shaping the grids to the air foil outlines, making it possible to readily apply these in extended lengths. In both forms shown, the grids are flat and thin and of the same thickness throughout, so as to readily conform to the desired contour.

The cover sheets 12, may be made readily detachable, thus to permit of the application of substitute imperforate sheets for covers when it is known that the ice preventers will not be needed for some time.

The ready removability of the cover sheet is desirable further as enabling ready inspection and repair if need be, of the absorbent insulating medium and enclosed portions of the grids. Also, this permits the ready substitution of cover sheets which may be perforated in different ways to meet different flying conditions.

The tubular form of grids enable liquid to be conducted to and discharged in the absorbent medium, irrespective and independent of atmospheric moisture, providing a further degree of control, for example, for effecting a certain amount of warming up the wings, prior to encountering icing conditions. For such liquid conducting utilization, the tubular grids would have suitable liquid supply connections and controls and might have discharge orifices in the sides or be left open at the ends.

The moisture in such cases may be supplied by steam or the like, instead of in liquid form.

As shown in Fig. 1, the buses may be covered with insulation 20, so that conduction through the moistened absorbent medium will be across the bars or hollow wires 9, 10, of opposite polarity. By supplying moisture internally through the hollow grid structures as through liquid supply connections 21, to the hollow buses, the heating effect may be governed at will and this internal method of moistening the absorbent insulating medium may be employed in place of the moistening by atmospheric moisture, in which case an unbroken imperforate cover sheet could be employed.

What is claimed is:

1. Means for preventing ice formation, comprising hollow grids of opposite polarity and arranged with portions of said grids in separated opposed relation, moisture absorbent material of normal electrically insulating character between the opposing portions of said grids of opposite polarity, said grids being of tubular formation, means for impressing current of opposite polarity on said grids and means for supplying moisture to the interior of said tubular grids, said grids having escape openings for such moisture.

2. Means for preventing ice formation on aircraft, comprising hollow conductors of opposite polarity arranged in opposed spaced relation, moisture absorbent material of normal electrically insulating character between opposing portions of said hollow conductors, means for supplying moisture to said absorbent insulating material through said hollow conductors and a smooth imperforate cover over said absorbent insulating material.

3. Means for preventing ice formation on aircraft, comprising opposed tubular conductors of opposite polarity, moisture absorbent material of normally electrical insulating character between opposing portions of said tubular conductors and means for supplying moisture through said tubular conductors to said interposed absorbent material to establish conduction of heating current through said absorbent material between said conductors of opposite polarity.

4. Means for preventing ice formation on aircraft, comprising opposed tubular conductors of opposite polarity, moisture absorbent material of normally electrical insulating character between opposing portions of said tubular conductors and means for supplying moisture through said tubular conductors to said interposed absorbent material to establish conduction of heating current through said absorbent material between said conductors of opposite polarity and a cover of flat airfoil smooth surface sheet material over said moisture absorbent material and embedded tubular conductors.

EDWARD A. DRISCOLL.